United States Patent
Durdagi et al.

(10) Patent No.: US 12,478,613 B2
(45) Date of Patent: Nov. 25, 2025

(54) SELECTIVE MAO-B INHIBITOR DRG-MAOB-2 FOR USE IN TREATMENT OF NEURODEGENERATIVE DISEASES

(71) Applicants: BAHCESEHIR UNIVERSITESI, Besiktas/Instanbul (TR); AGRI IBRAHIM CECEN UNIVERSITESI STRATEJI DAIRE BASK., Agri (TR); ISTANBUL GEDIK UNIVERSITESI, Istanbul (TR); ISTANBUL TEKNIK UNIVERSITESI REKTORLUGU, Istanbul (TR)

(72) Inventors: Serdar Durdagi, Besiktas/Istanbul (TR); Mine Yurtsever, Besiktas/Istanbul (TR); Yusuf Serhat Is, Besiktas/Istanbul (TR); Busecan Aksoydan, Besiktas/Istanbul (TR); Murat Senturk, Besiktas/Istanbul (TR)

(73) Assignees: BAHCESEHIR UNIVERSITESI, Istanbul (TR); AGRI IBRAHIM CECEN UNIVERSITESI STRATEJI DAIRE BASK., Istanbul (TR); ISTANBUL GEDIK UNIVERSITESI, Istanbul (TR); ISTANBUL TEKNIK UNIVERSITESI REKTORLUGU, Istanbul (TR)

(*) Notice: Subject to any disclaimer, the term of this patent is extended or adjusted under 35 U.S.C. 154(b) by 497 days.

(21) Appl. No.: 17/904,997

(22) PCT Filed: Feb. 25, 2021

(86) PCT No.: PCT/TR2021/050171
§ 371 (c)(1),
(2) Date: Aug. 25, 2022

(87) PCT Pub. No.: WO2021/173103
PCT Pub. Date: Sep. 2, 2021

(65) Prior Publication Data
US 2023/0088611 A1    Mar. 23, 2023

(30) Foreign Application Priority Data
Feb. 26, 2020   (TR) ................. 2020/02935

(51) Int. Cl.
A61K 31/4184  (2006.01)
A61K 45/06    (2006.01)
C07D 403/12   (2006.01)

(52) U.S. Cl.
CPC .......... *A61K 31/4184* (2013.01); *A61K 45/06* (2013.01); *C07D 403/12* (2013.01)

(58) Field of Classification Search
CPC ... A61K 31/4184; A61K 45/06; C07D 403/12
See application file for complete search history.

(56) References Cited

PUBLICATIONS

STNext Registry (RN# 2095899-12-8, Entered STN date: May 18, 2017, obtained from STNext Feb. 12, 2025) (Year: 2017).*
International Search Report in International Application No. PCT/TR2021/050171 dated Jun. 25, 2021.
Tzvetkov et al., "Indazole- and indole-5-carboxamides: selective and reversible monoamine oxidase B inhibitors with subnanomolar potency", Journal of Medical Chemistry, 2014, pp. 6679-6703, 57(15).
Chimenti et al., Monoamine oxidase isoform-dependent tautomeric influence in the recognition of 3,5-diaryl pyrazole inhibitors, Journal of Medical Chemistry, 2017, pp. 425-428, 50(3).
Is et al., "Proposing Novel MAO-B Hit Inhibitors Using Multidimensional Molecular Modeling Approaches and Application of Binary QSAR Models for Prediction of Their Therapeutic Activity, Pharmacokinetic and Toxicity Properties", ACS Chemical Neuroscience, 2018, pp. 1768-1782, 9(7).
Rao et al., "Design and synthesis of novel benzyloxy-tethered-chromone-carboxamide derivatives as potent and selective human monoamine oxidase-b inhibitors", Chemical Papers, 2021, pp. 703-716, 75(2).
Sasmal et al., "Novel pyrazole-3-carboxamide derivatives as cannabinoid-1 (CB1) antagonists: journey from non-polar to polar amides", Bioorganic and medicinal chemistry letters, 2011, pp. 562-568, 21(1).

* cited by examiner

*Primary Examiner* — Renee Claytor
*Assistant Examiner* — Christopher Lindsay Johnson
(74) *Attorney, Agent, or Firm* — RAPHAEL BELLUM PLLC

(57) ABSTRACT

The invention relates to compound shown with formula (I) or a pharmaceutically acceptable derivative thereof for use as a novel inhibitor of MAO-B.

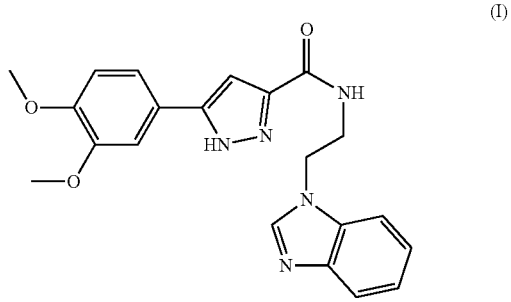

(I)

4 Claims, No Drawings

SELECTIVE MAO-B INHIBITOR DRG-MAOB-2 FOR USE IN TREATMENT OF NEURODEGENERATIVE DISEASES

TECHNICAL BACKGROUND

Nowadays, neurodegenerative diseases are among the most common disorders after heart diseases and cancer. Millions of people around the world are struggling with central nervous system diseases such as Parkinson's disease, Alzheimer's disease and multiple sclerosis. Neurodegenerative diseases characterized by irreversible degeneration of neurons in the central and peripheral nervous systems are incurable with current medical facilities. Treatments of people suffering from such diseases are both long-term and economically challenging. Although there is no definitive and permanent treatment of neurodegenerative diseases, there are still more scientific researches for this purpose.

In the treatment of the above-mentioned diseases, monoamine oxidase enzyme (MAO) is seen as the target structure. Monoamine oxidase is a protein that acts in the cell bounding on the outer membrane of the mitochondria. MAO is responsible for the chemical breakdown of neurotransmitter molecules. The negative effects of neurotransmitter substances in the synaptic spaces which are responsible for the communications of the neurons are prevented by this way.

One of the causes of such neurodegenerative diseases is the lack of neurotransmitter substances in the synaptic spaces. Excessive activity of MAO enzyme may cause significant decrease in the amount of chemicals in synapses. Therefore, the drug candidates to be used in the treatment of these diseases should inhibit MAO enzymes.

STATE OF THE ART

The MAO enzyme has two different isoforms, MAO-A and MAO-B. These isoforms are distinguished from each other by the difference in amino acid numbers and the tissues they exist.

In the treatment of neurodegenerative diseases, MAO-B isoform is prominent. Therefore, MAO-B selectivity is one of the most important properties of drug molecules developed for the treatment of these diseases.

Even though MAO-A and MAO-B are distinguished from one another they still have around 70% sequence identity which makes coming up with a MAO-B selective inhibitor challenging, however considering the expected therapeutic benefits there is need in the art for drug molecules that are selectively inhibiting MAO-B for use in treatment of neurodegenerative diseases.

The inventors have found that a new compound shown with Formula I acts as a selective inhibitor of MAO-B.

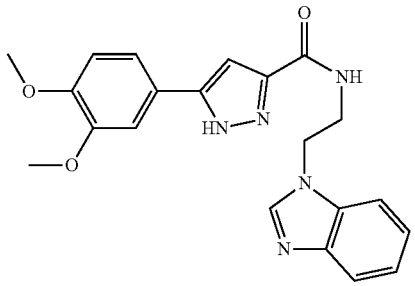

Formula I

The compound shown with formula I according to present invention is thus a representative of a novel compound that is suitable for use in several disorders where an inhibition of MAO-B enzyme produces a therapeutically desirable result. Such diseases can for example be neurodegenerative diseases such as Parkinson's, Alzheimer, depression etc. Therefore, present invention not only relates to novel compounds shown with formula I but also to use of said compounds for treatment of neurodegenerative diseases such as Parkinson's, Alzheimer, depression.

DETAILED DESCRIPTION OF THE INVENTION

The invention relates to compound shown with formula I, which is DRG-MAOB-2, or a pharmaceutically acceptable derivative thereof.

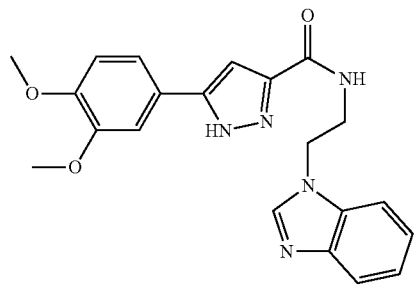

Formula I

Unless specified otherwise, the terms "compound of the present invention" or "compound of invention" or "compound of formula I" or "compound shown with formula I" are used interchangeable and refer to compounds of formula I and salts thereof, hydrates or solvates of the compound of formula I or its salts, all possible stereoisomers (diastereomers and enantiomers), tautomers, isotopically labeled compounds (including deuterium substitutions), or its forms that form under physiological conditions of the human body, as well as inherently formed moieties (e.g., polymorphs, solvates and/or hydrates).

In other words, the term "pharmaceutically acceptable derivative thereof" refers to hydrates, solvates, prodrugs, all possible stereoisomers, salts, esters, tautomers, isotopically labeled derivatives or forms of compound of formula I that form under physiological conditions of the human body.

In a preferred embodiment of the invention the term "pharmaceutically acceptable derivative thereof" refers to any derivative of compound of formula, wherein the structural modification was made in order to render the compound suitable for passing through the blood-brain barrier.

Several embodiments of the invention are described herein. It must be considered that each specified embodiment can be combined with other specified features to provide further embodiments. The terms used in the singular will also include plural and vice versa.

As disclosed herein the term "enantiomers" mean a pair of stereoisomers that are non-superimposable mirror images of each other. A 1:1 mixture of a pair of enantiomers is a "racemic" mixture. The absolute stereochemistry is specified according to the Cahn-Ingold-Prelog R-S system. When a compound is a pure enantiomer the stereochemistry at each chiral carbon may be specified by either R or S. Compound of formula I has a chiral center. In a preferred embodiment of the invention compound of formula I is in the form of a 1:1 racemic mixture of R and S enantiomers. The compound of formula I can also be in pure R form or in pure S form or a mixture thereof in any ratio.

The present invention includes all possible isomers including racemates and optically pure forms of compound of formula I. Said forms can be prepared by using conventional techniques known in the art such as by use of chiral reagents or other methods.

As disclosed herein the term "salts" mean acid addition of base addition salts of the compound of invention. In particular the salts include "the pharmaceutically acceptable salts" which refer to salts that retain the biological effectiveness and effectiveness of the compound of invention while not having any biologically or otherwise unwanted properties such as toxicity or causing any kind of formulation difficulties.

Pharmaceutically acceptable acid addition salts can be formed with organic acids and/or inorganic acids. Acid addition salts of the compound according to present invention can be selected from a group comprising; acetate, aspartate, benzoate, besylate, bromide/hydrobromide, bicarbonate/carbonate, bisulfate/sulfate, camphorsulfonate, chloride/hydrochloride, chlortheophyllonate, citrate, ethandisulfonate, fumarate, gluceptate, gluconate, glucuronate, hippurate, hydroiodide/iodide, isethionate, lactate, lactobionate, lauryl sulfate, malate, maleate, malonate, mandelate, mesylate, methylsulphate, naphthoate, napsylate, nicotinate, nitrate, octadecanoate, oleate, oxalate, palmitate, pamoate, phosphate/hydrogen phosphate/dihydrogen phosphate, polygalacturonate, propionate, stearate, succinate, sulfosalicylate, tartrate, tosylate and trifluoroacetate salts.

Pharmaceutically acceptable base addition salts can be formed with organic bases and/or inorganic bases. Bases appropriate for preparation of base addition salts of the compound of the invention can be selected from sodium hydroxide, sodium carbonate, sodium bicarbonate, calcium hydroxide, calcium carbonate, calcium bicarbonate, magnesium hydroxide, magnesium carbonate, magnesium bicarbonate, potassium hydroxide, potassium carbonate, potassium bicarbonate and the like.

As disclosed herein the term "isotopically labeled compounds" refers to compounds of formula I wherein one or more atoms are replaced with an atom having selected atomic mass or mass number. Such replacements can be made with for example; $^2H$, $^3H$, $^{11}C$, $^{13}C$, $^{14}C$, $^{15}N$, $^{18}F$ $^{31}P$, $^{32}P$, $^{35}S$, $^{36}Cl$, $^{125}I$. Such isotopically labeled variants of compound of the invention can be used for detection or imaging techniques known in the art or for radioactive treatment of patients.

In another aspect present invention relates to pharmaceutical compositions comprising compound of formula I, DRG-MAOB-2, or a pharmaceutically acceptable derivative thereof and at least one pharmaceutically acceptable excipient.

In a preferred embodiment of the invention, the pharmaceutically acceptable excipient can be selected from a group comprising; solvents, antioxidants, preservatives (e.g. antibacterial agents, antifungal agents), isotonic agents, absorption delaying agents, sats, preservatives, stabilizers, binders, disintegrants, lubricants, sweetening agents, flavoring agents and combinations thereof. Particular examples of each group are disclosed in Remington's Pharmaceutical Sciences, 18th Ed. Mack Printing Company, 1990 and incorporated herein by reference.

The pharmaceutical compositions comprising compound of formula I or a pharmaceutically acceptable derivative thereof can be formulated for different routes of administration. In an embodiment of the invention, pharmaceutical compositions comprising compound of formula I can be formulated for oral administration, parenteral administration, topical administration or rectal administration.

In a preferred embodiment of the invention, pharmaceutical compositions of the invention for oral administration can be in the form of tablets, lozenges, aqueous or oily suspensions, dispersible powders or granules, emulsion, hard or soft capsules, or syrups or elixirs.

In a preferred embodiment of the invention, pharmaceutical compositions of the invention for parenteral administration can be in the form of isotonic solutions or suspensions or in to form of lyophilized powder suitable for reconstitution prior to administration. Said pharmaceutical compositions of the invention for parenteral administration can be for intramuscular, intravenous, subcutaneous, intraperitoneal, intratracheal administration.

In a preferred embodiment of the invention, pharmaceutical compositions of the invention for topical administration can be in the form of aqueous solutions, suspensions, ointments, pastes, lotions, transdermal patches, gels, creams, or sprayable formulations such as aerosols. Such topical administration covers administration through skin, eye or nose (i.e. intranasal administration). Thus, pharmaceutical compositions of the invention can be in the form of dry powders, solutions or aerosols for administration through pressurized containers, pump, spray, atomizer or nebulizer with or without a suitable propellant.

The pharmaceutical composition or combination of the present invention can be in unit dosage of about 1-1000 mg of active ingredient(s) for a subject of about 50-70 kg, or about 1-750 mg or about 1-500 mg or about 1-250 mg or about 1-150 mg or about 0.5-100 mg, or about 1-50 mg of active ingredients for a subject of about 50-70 kg. The therapeutically effective dosage of a compound, the pharmaceutical composition, or the combinations thereof, is dependent on the species of the subject, the body weight, age and individual condition, the disorder or disease or the severity thereof being treated. A physician, clinician or veterinarian of ordinary skill can readily determine the effective amount of each of the active ingredients necessary to prevent, treat or inhibit the progress of the disorder or disease.

In a preferred embodiment, the invention, relates to compound of formula I, DRG-MAOB-2, or a pharmaceutically acceptable derivative thereof for use in treatment of a disorder mediated by the activity (including normal activity or especially over activity) of MAO-B enzyme.

In an embodiment, the invention relates to compound of formula I or a pharmaceutically acceptable derivative thereof for use in treatment of a disorder wherein a desirable therapeutic response is observed upon administration of a MAO-B inhibitor.

In another aspect the invention relates to the use of a compound of formula I or a pharmaceutically acceptable derivative thereof as defined herein, for the manufacture of a medicament for the treatment of a disorder or a disease in a subject mediated by the activity of MOA-B enzyme.

In a preferred embodiment, a disorder mediated by the activity of MAO-B is a neurodegenerative disease.

As used herein, the term "neurodegenerative diseases"; refers to diseases characterized by the progressive deterioration of neuronal structures or functions.

In an embodiment of the invention, neurodegenerative disease includes Alzheimer's disease, Parkinson's disease, Huntington's disease, fronto temporal dementia (or Pick's disease), amyotrophic lateral sclerosis (ALS), spinocerebellar ataxia (SCA), progressive bulbar palsy (PBP), pseudobulbar palsy, progressive muscular atrophy (PMA), primary lateral sclerosis (PLA), monomelic amyotrophy, Spinal muscular atrophy (SMA) type 0, 1, 2, 3 and 4, Creutzfeldt-Jakob disease (CJD), Kuru, Gerstmann-Sträussler-Scheinker syndrome, dementia with Lewy bodies (DLB), Lafora disease.

In a preferred embodiment of the invention, neurodegenerative disease is Alzheimer's disease, Parkinson's disease, Huntington's disease or amyotrophic lateral sclerosis (ALS)

In another aspect, the invention relates to combinations comprising compound of formula I or pharmaceutically acceptable derivatives thereof and one or more additional active agent selected from a group comprising; acetylcholinesterase inhibitors, NMDA receptor antagonists, sesquiterpene alkaloid compounds, COMT inhibitors, dopamine agonists, other MAO-B inhibitors, neuroleptics, benzodiazepines, selective serotonin reuptake inhibitors, atypical antipsychotic drugs, opioids or other agents.

In an embodiment of the invention, acetylcholinesterase inhibitor can be selected from the group comprising but not limited to; tacrine, rivastigmine, galantamine and donepezil.

In an embodiment of the invention, NMDA receptor antagonist can be selected from the group comprising but not limited to; memantine and huperzine A.

In an embodiment of the invention, COMT inhibitors can be selected from the group comprising but not limited to; tolcapone and entacapone.

In an embodiment of the invention, dopamine agonists can be selected from the group comprising but not limited to; bromocriptine, pergolide, pramipexole, ropinirole, piribedil, cabergoline, apomorphine, rotigotine and lisuride.

In an embodiment of the invention, other MAO-B inhibitors can be selected from the group comprising but not limited to; safinamide, selegiline and rasagiline.

In an embodiment of the invention, neuroleptics can be selected from the group comprising but not limited to; benperidol, bromperidol, droperidol, haloperidol, moperone, pipamperone, timiperone, fluspirilene, penfluridol, pimozide, acepromazine, chlorpromazine, cyamemazine, dixyrazine, fluphenazine, levomepromazine, mesoridazine, perazine, pericyazine, perphenazine, pipotiazine, prochlorperazine, promazine, promethazine, prothipendyl, thioproperazine, thioridazine, trifluoperzine, chlorprothixene, clopenthixol, flupentixol, thiothixene, zuclopenthixol, sulpiride, sultopride, veralipride, carpipramine, clocapramine, clorotepine, clotiapine, loxapine, mosapramine, molindone, amisulpride, nemonapride, remoxipride, sultopride, iloperidone, lurasidone, paliperidone, paliperidone palmitate, perospirone, risperidone, ziprasidone, melperone, aripiprazole, aripiprazole lauroxil, brexpiprazole, cariprazine, asenapine, clozapine, olanzapine, quetiapine, zotepine, blonanserin, pimavanserin, sertindole.

In an embodiment of the invention, benzodiazepines can be selected from the group comprising but not limited to; 2-oxoquazepam, 3-hydroxyphenazepam, bromazepam, camazepam, carburazepam, cinazepam, cinolazepam, clonazepam, cloniprazepam, clorazepate, cyprazepam, delorazepam, Demoxepam, Desmethylflunitrazepam, Devazepide, Diazepam, Diclazepam, Difludiazepam, Doxefazepam, Elfazepam, Ethyl carfluzepate, Ethyl dirazepate, Ethyl loflazepate, Flubromazepam, Fletazepam, Fludiazepam, Flunitrazepam, Flurazepam, Flutemazepam, Flutoprazepam, Fosazepam, Gidazepam, Halazepam, Iclazepam, Irazepine, Kenazepine, Ketazolam, Lorazepam, Lormetazepam, Lufuradom, Meclonazepam, Medazepam, Menitrazepam, Metaclazepam, Motrazepam, N-Desalkylflurazepam, Nifoxipam, Nimetazepam, Nitemazepam, Nitrazepam, Nitrazepate, Nordazepam, Nortetrazepam, Oxazepam, Phenazepam, Pinazepam, Pivoxazepam, Prazepam, Proflazepam, Quazepam, Reclazepam, Sulazepam, Temazepam, Tetrazepam, Tifluadom, Tolufazepam, Triflunordazepam, Tuclazepam, Uldazepam, Arfendazam, Clobazam, Lofendazam, Triflubazam, Girisopam, Nerisopam, Talampanel, Tofisopam, Adinazolam, Alprazolam, Bromazolam, Clonazolam, Estazolam, Flualprazolam, Flubromazolam, Flunitrazolam, Nitrazolam, Pyrazolam, Triazolam, Bretazenil, Climazolam, Flumazenil, Imidazenil, I-Iomazenil, Loprazolam, Midazolam, Remimazolam, Sarmazenil, Cloxazolam, Flutazolam, Haloxazolam, Mexazolam, Oxazolam, Bentazepam, Clotiazepam, Brotizolam, Ciclotizolam, Deschloroetizolam, Etizolam, Fluclotizolam, Israpafant, Metizolam, Olanzapine, Telenzepine, Lopirazepam, Zapizolam, Razobazam, Ripazepam, Zolazepam, Zomebazam, Zometapine, Premazepam, Clazolam, Anthramycin, Avizafone, Rilmazafone.

In an embodiment of the invention, benzodiazepines can be selected from the group comprising but not limited to; Citalopram, Escitalopram, Fluoxetine, Fluvoxamine, Paroxetine, Sertraline.

In an embodiment of the invention, atypical antipsychotic drugs can be selected from the group comprising but not limited to; amisulpride, aripiprazole, asenapine, bionanserin, clozapine, iloperidone, lurasidone, melperone, olanzapine, paliperidone, perospirone, quetiapine, remoxipride, risperidone, sertindole, sulpride, ziprasidone.

In an embodiment of the invention, opioids can be selected from the group comprising but not limited to; Codeine, Morphine, Thebaine, Oripavine, Diacetylmorphine (morphine diacetate; heroin), Nicomorphine (morphine dinicotinate), Dipropanoylmorphine (morphine dipropionate), Diacetyldihydromorphine, Acetylpropionylmorphine, Desomorphine, Methyldesorphine, Dibenzoylmorphine, Dihydrocodeine, Ethylmorphine, Heterocodeine, Buprenorphine, Etorphine, Hydrocodone, Hydromorphone, Oxycodone, Oxymorphone, Fentanyl, Alphamethylfentanyl, Alfentanil, Sufentanil, Remifentanil, Carfentanyl, Ohmefentanyl, Prodine, PEPAP, Promedol, Pethidine (meperidine), Ketobemidone, MPPP, Allylprodine, Propoxyphene, Dextropropoxyphene, Dextromoramide, Bezitramide, Piritramide, Methadone, Dipipanone, Levomethadyl Acetate (LAAM), Difenoxin, Diphenoxylate, Loperamide, Dezocine, Pentazocine, Phenazocine, Buprenorphine, Dihydroetorphine, Etorphine, Butorphanol, Nalbuphine, Levorphanol, Levomethorphan, Racemethorphan, Lefetamine, Menthol, Meptazinol, Mitragynine, Tilidine, Tramadol, Tapentadol, Eluxadoline, 7-Hydroxymitragynine, Nalmefene, Naloxone, Naltrexone, Methylnaltrexone, Naloxegol.

In an embodiment of the invention, other agents can be selected from the group comprising but not limited to levodopa, tetrabenazine, Amantadine, Remacemide, valproic acid, ethyl-eicosapentoic acid, mirtazapine, riluzole, edaravone, gabapentin, pregabalin, baclofen, tizanidine, scopolamine, amitriptyline, glycopyrrolate, mexiletine, methylphenidate, dextroamphetamine, modafinil, armodafinil, levetiracetam, topiramate, perampanel.

In an embodiment of the invention, such combinations can be in a form wherein compound of formula I or a pharmaceutically acceptable derivative thereof and one or more therapeutically active agents are formulated together.

In another embodiment of the invention, compound of formula I or a pharmaceutically acceptable derivative thereof and one or more therapeutically active agents are formulated separately but they are administered to a patient in need thereof simultaneously or sequentially.

Comprising in the context of the present specification is intended to meaning including.

Where technically appropriate, embodiments of the invention may be combined.

Embodiments are described herein as comprising certain features/elements. The disclosure also extends to separate embodiments consisting or consisting essentially of said features/elements.

Technical references such as patents and applications are incorporated herein by reference.

Any embodiments specifically and explicitly recited herein may form the basis of a disclaimer either alone or in combination with one or more further embodiments.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

The invention will now be described with reference to the following examples, which are merely illustrative and should not in any way be construed as limiting the scope of the present invention.

EXAMPLES

Example 1: MAO Inhibitory Assay

MAO inhibitory activity was assayed using the method of Novaroli et al. with minor modifications. Briefly, 140 μL of 0.1 M potassium phosphate buffer (pH 7.4), 8 μL of 0.75 mM kynuramine, and 2 μL of a dimethyl sulfoxide (DMSO) inhibitor solution (final DMSO concentration of 1% (v/v) and final concentrations of the inhibitors of 0-1 μM), were preincubated at 37° C. for 10 min. Diluted human recombinant enzyme (50 μL) was then added to obtain a final protein concentration of 0.0075 mg/mL (MAO-A) or 0.015 mg/mL (MAO-B) in the assay mixture. The reaction mixture was further incubated at 37° C. and the reaction was stopped after 20 min by the addition of 75 μL of 2 M NaOH. The product generated by MAO, 4-quinolinol, is fluorescent and was measured at Ex 310 nm/Em 400 nm using a microplate reader (Thermo Scientific-Multiskan GO). Each data points of samples were triplicate. The sample solution was replaced with DMSO to provide a negative control. The IC50 values were calculated from a line through two points which sandwiched the point of 50% (IC50) by plotting the remained activity (%) related to control (100%) versus the logarithm of the inhibitor concentration to obtain a sigmoidal dose-response curve The IC50 value of compound of formula I was determined to be $IC_{50}$ value of 29.46±1.10 nM in human MAO-A and 3.22±0.02 nM in human MAO-B. This result indicates that compound of formula I according to present invention has approximately 9 fold more potent binding to MOA-B compared to MOA-A. This result shows that the obtained molecule is a selective inhibitor of MOA-B enzyme.

The invention claimed is:

1. A pharmaceutical composition comprising a compound of Formula I,

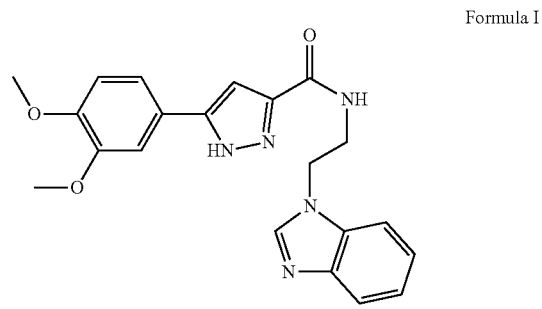 [SMILES: COc1ccc(-c2cc(C(=O)NCCn3cnc4ccccc43)n[nH]2)cc1OC]

Formula I or a pharmaceutically acceptable derivative thereof, and at least one pharmaceutically acceptable excipient.

2. A pharmaceutical composition comprising a compound of Formula I,

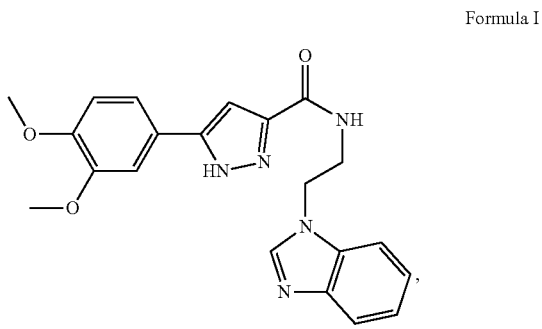 [SMILES: COc1ccc(-c2cc(C(=O)NCCn3cnc4ccccc43)n[nH]2)cc1OC]

Formula I or a pharmaceutically acceptable derivative thereof, and one or more additional pharmaceutically active agent selected from the group consisting of acetylcholinesterase inhibitors, NMDA receptor antagonists, sesquiterpene alkaloid compounds, COMT inhibitors, dopamine agonists, other MAO-B inhibitors, neuroleptics, benzodiazepines, selective serotonin reuptake inhibitors, atypical antipsychotic drugs, opioids, other agents, and combinations thereof.

3. The pharmaceutical composition of claim 1, wherein the pharmaceutically acceptable derivative of the compound of Formula I is a hydrate, a solvate, a prodrug, a stereoisomer, a salt, an ester, a tautomer, or an isotopically labeled derivative thereof, or a form thereof that forms under physiological conditions of the human body.

4. The pharmaceutical composition of claim 2, wherein the pharmaceutically acceptable derivative of the compound of Formula I is a hydrate, a solvate, a prodrug, a stereoisomer, a salt, an ester, a tautomer, or an isotopically labeled derivative thereof, or a form thereof that forms under physiological conditions of the human body.

* * * * *